United States Patent Office 3,390,318
Patented June 25, 1968

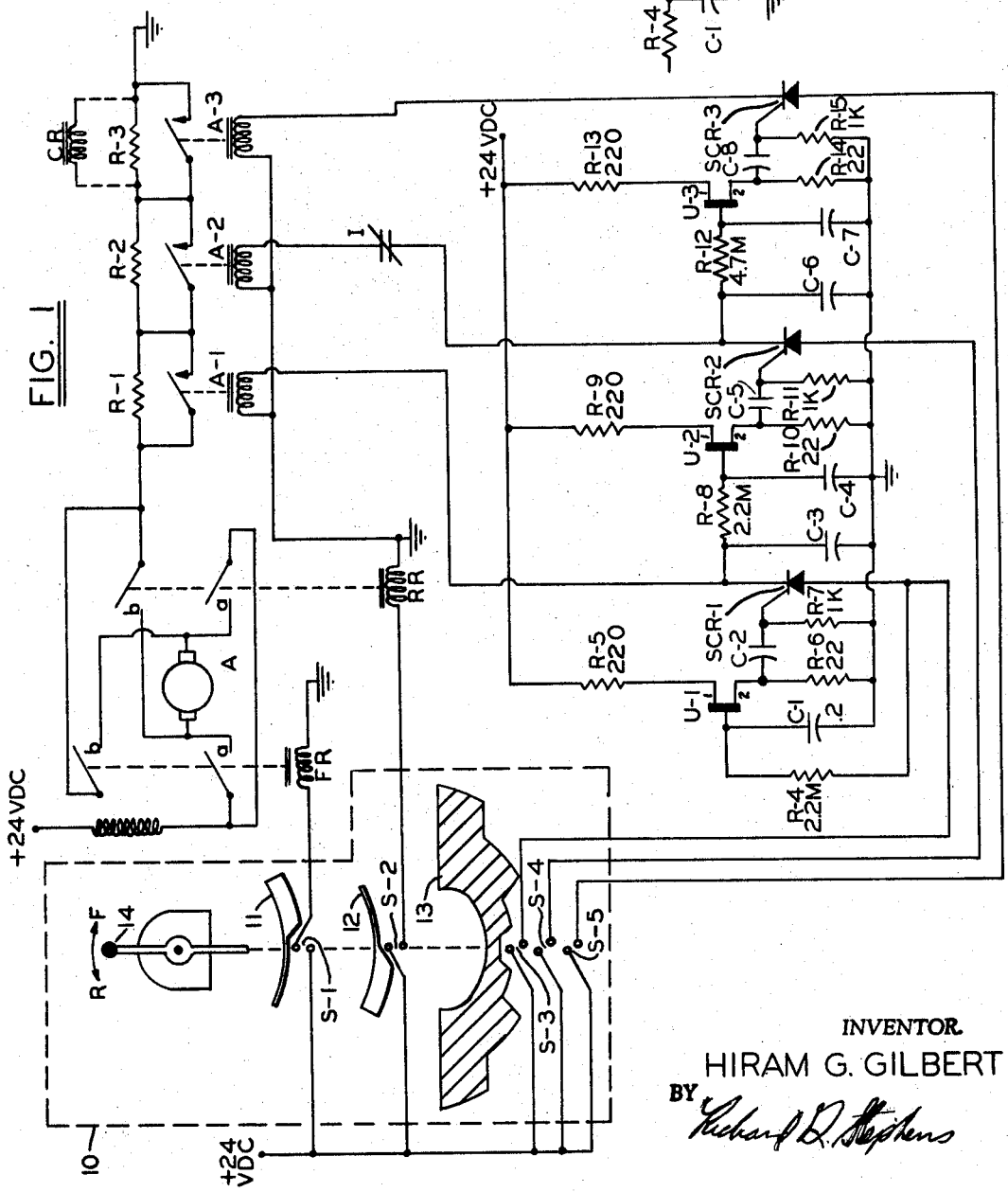

3,390,318
ACCELERATION CONTROL DEVICE FOR AN ELECTRIC MOTOR INCLUDING A UNIJUNCTION TRANSISTOR AND A CONTROLLED RECTIFIER
Hiram G. Gilbert, Binghamton, N.Y., assignor to The Raymond Corporation, Greene, N.Y., a corporation of New York
Filed July 6, 1965, Ser. No. 469,657
7 Claims. (Cl. 318—422)

ABSTRACT OF THE DISCLOSURE

An electric motor acceleration contactor timing system in which the coils of a series of successive electromagnet acceleration contactors are conditioned to be energized by advancement of a manual switch and then energized by firing of a controlled rectifier associated with each contactor coil, each controlled rectifier being fired by a pulse from a respective unijunction transistor, and each unijunction transistor being arranged to fire when the output of an associated RC integrating network exceeds a selected level. Operation of the manual switch applies an input signal to a first of the integrating networks, and the firing of each controlled rectifier (other than the last one) connects an input signal to the integrating circuit associated with the next controlled rectifier.

---

This invention relates to a timing device, and more particularly to apparatus for automatically timing the operation of acceleration contactors in motor circuits. A variety of electric motor control circuits, and particularly those associated with series-connected traction motors, utilize a plurality of contactors, or electromagnetic switches, to successively short out a series of accelerating resistors to control motor torque. In some systems such contactors are also used to reconnect a single motor to different electrical configurations, or to reconnect plural motors into successive configurations.

Most operator-controlled electric vehicles employing such traction motor circuits are provided with manual direction and speed controls, which may comprise either a single control or two separate controls. The direction control commonly determines the relative polarity relationship between a motor armature and a motor field, and the speed control shorts out series accelerating resistors as the control is operated from a low speed position to higher speed positions. To prevent extreme vehicle accelerations while still allowing a maximum safe acceleration, and sometimes to limit motor current in order to avoid damaging the electrical control circuit, it has been common to provide control timers which limit the rate at which successive acceleration resistors may be shorted out. Even if the operator moves his speed control extremely rapidly from the zero speed position to a maximum speed position, such control timers limit the rate at which successive acceleration contactors close, providing limited and relatively smooth acceleration. In typical applications each acceleration contactor after the first contactor is prevented from closing until a preceding contactor has been closed for a time period of the order of one-half second or so.

Many such control timers of the prior art have been pneumatic and have operated on a dashpot principle. In order to provide sufficient delay and sufficient switch-closing force and to be sufficiently rugged, such prior art pneumatic timers have been undesirably bulky for some applications. Such timers necessarily must be mounted at the hand (or foot) control location, or undesirably connected to the manual control by means of a linkage. This requirement frequently wastes space, which is extremely undesirable in certain narrow-aisle lift truck applications, for example. Furthermore, such pneumatic time delay systems frequently become mis-adjusted, and their readjustment is tedious and time-consuming.

Various electrical time-delay schemes are also known in the art. Some require special slow-closing relays which are expensive, which require delicate adjustment and which are subject to frequent misadjustment. Others require very large capacitors. Others depend upon large self-inductance in the coil of a contactor to delay current flow so that a contactor does not close until sometime after voltage is applied to it, but such systems are undesirable because current build-up in the contactor coils may be too gradual, providing an undesirably slowly-increasing closing force instead of snap-action. Various linkages and over-center spring mechanisms may be employed to change gradual force to snap-action closing, but they contribute friction, requiring more operating power, and such mechanisms sometimes get out of adjustment. Most, if not all such prior electrical contactor timer systems include auxiliary contacts on each contactor (except the last) to enable the coil circuit of the succeeding higher-speed contactor, and the pitting and dirtying of such auxiliary contacts requires frequent maintenance.

A primary object of the present invention is to overcome the above-noted deficiencies of prior art contactor timing systems, and to provide an improved all-electronic, solid-state contactor timing system which is economical, accurate and reliable and not subject to mis-adjustment. Having no mechanical moving parts, the apparatus of the present invention need not be located immediately adjacent the manual control which operates it, but instead may be connected to the control by small control wires, none of which need carry the heavy motor currents. It is desirable in many accelerating systems of the type described that means be provided to prevent further acceleration if one or more special conditions (such as emergency condition) exist, but that further acceleration resume automatically upon disappearance of the special conditions. Many of the acceleration timing systems of the prior art require that the operator "center" or "reset" his control after disappearance of an emergency condition and accelerate again through all of the acceleration steps. In the invention further acceleration is resumed automatically upon removal of the emergency condition without the need for any operator action.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which:

FIG. 1 is an electrical schematic diagram of a preferred form of the invention; and FIG. 2 illustrates a portion of a modified embodiment of the invention.

In FIG. 1 a manual control switch of known type is diagrammatically shown within dashed lines at 10 as including cams 11, 12 and 13. Upon movement of knob 14 a predetermined amount in the "forward" direction from the centered "zero" position shown, cam 11 closes contacts S–1, applying voltage to energize the coil of forward relay FR, and as knob 14 is moved further forward through increasing speed ranges switch S–1 remains closed. Upon movement of knob 14 in the "reverse" direction, cam 12 closes contacts S-2, energizing reverse relay RR in similar fashion. Upon movement of knob 14 a first predetermined amount in either direction cam 13 will be seen to close switch S-3, and greater displacements of knob 14 in either direction will be seen to close switches S-4 and S-5, with S-3 remaining closed when S-4 is closed, and with both S-3 and S-4 remaining closed when S-5 is closed. While control switch 10 is shown provided with 3 acceleration levels, and 3 acceleration steps, other numbers of levels are frequently used, as is well known.

Also shown in FIG. 1 is a well-known reversible series motor power circuit. Voltage from a 24-volt DC source, such as a battery, is applied through a motor field winding F, through the reversing sets of contacts of relays FR and RR, the motor armature A and then through a series string of accelerating resistance R-1, R-2 and R-3, to the other side of the 24-volt power source, which is shown as ground. If forward relay FR is energized, current will be seen to flow rightwardly through armature A as viewed in FIG. 1, and leftwardly if reverse relay RR is energized instead. As is well known, motor reversal may be accomplished by reversing field winding connections instead of armature connections. If the contacts of directional relays FR and RR are sufficiently durable, closure of one or the other of these relays may be used to initiate motor operation. In such an arrangement for acceleration speed ranges may be provided with three accelerating relays A-1, A-2 and A-3, and cam 13 usually will be arranged to close switch S-3 at a control displacement somewhat greater than that required to close S-1 or S-2. On the other hand, if it is desired that the contacts of relays FR and RR not be opened or closed under load, acceleration resistor R-1 of FIG. 1 may be omitted, so that no voltage is applied to the motor until contactor A-1 is energized, and in such an arrangement, which allows for only three ranges of acceleration, cam 13 usually is arranged to close S-3 at a control displacement only slightly past that displacement which closes either S-1 or S-2.

In the prior art pneumatic time-delay switch controls mentioned above, switches corresponding to S-3, S-4 and S-5 are connected via a dashpot arrangement so as to close only at selected time periods after their respective cam levels are reached. In the invention, on the other hand switches S-3, S-4 and S-5 are operated immediately when knob 14 of control 10 is moved to various positions. When control 10 is moved so as to close switch S-3, plus voltage is immediately applied to the anode of silicon controlled-rectifier SCR-1, the anode of which is connected through the coil of contactor A-1 to ground. However, SCR-1 remains cut off until a sufficiently positive votlage is applied to its gate lead. Prior to any manipulation of control switch 10, as well as thereafter, it will be seen that supply voltage is applied via resistor R-5 through the emitter-emitter circuit of unijunction transistor U-1 and resistor R-6 to ground, but unless the unijunction transistor base becomes sufficiently positive with respect to emitter #2, transistor U-1 remains cut-off, with no appreciable base current.

Closure of switch S-3 will be seen to apply voltage via series resistor R-4 and shunt capacitor C-1 to the base of unijunction transistor U-1. Resistor R-4 and capacitor C-1 will be seen to comprise a lag or integrating network. The supply voltage charges up capacitor C-1 exponentially through resistor R-4, so that the voltage on the U-1 base increases. When the voltage on the U-1 base reaches approximately +12 volts with the components illustrated, transistor U-1 suddenly conducts, substantially shorting its emitter #2 to its base, so that the emitter #2 voltage is suddenly raised from near ground up toward the +12-volt level to which capacitor C-1 is charged; thereby providing a positive spike which is applied through capacitor C-2 to the gate lead SCR-1. Coupling capacitor C-2 and resistor R-7 will be seen to comprise a differentiating circuit, and hence they accentuate the voltage change at emitter #2 of unijunction U-1, providing a sharp spike on the SCR-1 gate lead. Resistance R-7 will be seen to be a fairly low impedance, as the gate lead circuit impedance connected in parallel with it is also a low impedance. In some embodiments of the invention resistances R-7 (and R-11 and R-15) may be omitted; however, the use of a low impedance connected to the gate circuit aids in recovery of the controlled rectifier junctions after the controlled rectifier is turned off. Because emitter #2 is returned to ground through a very low impedance (R-6), the charge on capacitor C-1 is dissipated very rapidly when U-1 conducts, and hence the U-1 base voltage drops to near zero, and, assuming switch S-1 remains closed, another charging cycle begins, with C-1 charging up again until unijunction transistor U-1 fires again. If switch S-3 is closed, so that there is anode voltage on SCR-1, the first positive spike applied to the SCR-1 gate lead (which spike has a peak amplitude of approximately +5 volts with the components shown) fires SCR-1, thereby energizing the coil of contactor A-1. Once SCR-1 fires, it remains on irrespective of its gate lead potential, until such time as its anode-cathode potential is reduced to below a given "maintaining" potential. The values of R-4 and C-1 shown provide a .44 second time-constant, so that U-1 fires about .5 second after switch S-3 is closed. Because the coils of contactors A-1, A-2 and A-3 must provide considerable magnetic force to close the heavy contacts required for accelerating currents, these contactor coils have rather large values of inductance, and hence current through the A-1 coil increases exponentially after SCR-1 fires. In order that the self-inductance of the A-1 coil not prevent SCR-1 from firing and exceeding its maintaining current level during the presence of the spike on the SCR-1 gate lead, capacitor C-3 is connected in parallel with the A-1 coil, between the SCR-1 cathode and ground. Thus C-3 acts as low impedance path to ground for the sudden rise in cathode potential as SCR-1 fires, allowing a narrow spike on the gate lead to fire SCR-1 even though the SCR-1 load, the A-1 contactor coil, is very inductive.

When SCR-1 fires (and energizes the coil of contactor A-1), the SCR-1 cathode voltage will be seen to raise from ground to near the +24-volt supply voltage. The SCR-1 cathode voltage is applied through a further integrating network (R-8, C-4) to the base of unijunction transistor U-2, which operates in a manner identical in principle to U-1, providing a spike through capacitor C-5 to fire SCR-2 if switch S-4 has closed so as to apply anode voltage to SCR-2. Firing of SCR-2 in turn energizes the coil of acceleration contactor A-2 and applies voltage to a third integrating network (R-12, C-7) to fire unijunction transistor U-3 after a time delay, thereby providing a pulse to turn on SCR-3 if switch S-5 has been closed so as to apply anode voltage to SCR-3.

Even if the operator moves control knob 14 very rapidly so as to close all three of switches S-3, S-4 and S-5, it will be seen that contactor A-2 cannot be energized until after a time period (determined by R-8 and C-4) after contactor A-1 has been energized, and further, that contactor A-3 cannot be energized until after a further time period (determined by R-12 and C-7) after contactor A-2 has been energized.

Assume that the operator moves switch 10 so as to close S-3 and then maintains the switch in that position, with only switch S-3 closed, for an extended time. SCR-1 will be fired (after the time delay governed by R-4 and C-1) in the manner mentioned above, and the firing of SCR-1 will automatically fire U-2 (after the further time delay governed by R-8 and C-4), thereby providing a positive spike on the SCR-2 gate lead. Because switch S-4 is open, however, there will be no anode voltage on SCR-2, and hence SCR-2 will not be turned on and contactor A-2 will not be picked up, and as further positive spikes are applied periodically to the SCR-2 gate lead, SCR-2 will remain cut-off, unless and until such time as the control switch is moved to close switch S-4.

In FIG. 1 a normally-closed interlock switch I, which is optional in many applications of the invention, is shown connected in series with SCR-2 and A-2 accelerating contactor coil. Interlock I may be deemed to represent a variety of different types of switches which are sometimes used to limit acceleration. For example, in various lift trucks capable of hoisting loads to great heights, it is dangerous to operate the truck at full speed or with maximum acceleration when the truck load carriage is raised, but safe to do so when the load carriage has been lowered below a given height. A switch corresponding to interlock switch I in FIG. 1 may be connected to the truck load carriage to open when load carriage height exceeds a predetermined height, thereby preventing contactor A-2 (and, of course A-3) from closing when the load carriage is raised too high. It is a feature of the invention that with such an arrangement, if the operator control switch 10 is positioned to close switch S-4, that SCR-2 will fire and coil A-2 will be energized *automatically* when the operator lowers the load carriage sufficiently to close interlock switch I, without the need of the operator temporarily moving the control back to a lower speed position to "reset" the system, as has been necessary in some prior art apparatus. While a single interlock switch has been shown in FIG. 1, it should be apparent (1) that a plurality of interlock switches sensitive to various conditions requiring acceleration limiting may be provided in series with a given one of the SCR-coil circuits shown in FIG. 1, and (2) that interlock switches may be provided in any of the SCR-coil circuits shown in FIG. 1. If desired, interlock I may be arranged to close at one load carriage height, and a similar interlock switch (not shown) may be used in series with SCR-3 and the A-3 coil to open when the load carriage height exceeds a predetermined lesser height. Furthermore, the interlocks need not necessarily be position-sensitive or associated with auxiliary vehicle equipment. In FIG. 1 the coil of voltage-sensitive relay CR is shown connected across accelerating resistor R-3, so that relay CR transfers when motor current exceeds a desired level. If the contacts of interlock I comprise contacts operated by relay CR, the opening of interlock I contacts during an overcurrent condition will automatically prevent energization of contactor A-2, and energization of A-3 cannot occur, of course, unless A-2 has been previously energized.

It will be seen that the time delay associated with each contactor is governed by an individual RC integrating circuit, and hence different time delays may be provided for the various contactors if desired. Also, in some applications of the invention it will be desirable to make the circuit time constants variable, as by making R-4, R-8 and/or R-12 adjustable, or by switching capacitors C-1, C-4 and/or C-7. If resistances R-4, R-8 and R-12 all comprise rheostats mounted on a common shaft, the time delays associated with all stages may be adjusted conveniently and simultaneously.

The device utilized to trigger the controlled-rectifier in each timing stage need not be specifically a unijunction transistor, but may comprise any voltage-sensitive or current-sensitive device which will switch suddenly between high impedance and low impedance conditions. FIGURE 2 illustrates portions of a modified circuit in which the output of integrating circuit R-4, C-1 is applied across a neon bulb, to fire the neon bulb when its firing potential is exceeded. Rather than using neon bulbs which fire at fairly high potentials, one may instead use PNPN diodes, for example to provide equivalent operation.

The invention will be seen also to be useful for timing applications other than motor contactor control.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

Having described my invention, what I claim as new and desire to secure by Letters Patent is:

1. In a motor control system having a motor, a manual control adapted to operate a switch as said control is displaced a predetermined amount from a reference position, and an electromagnet contactor having an operating coil connected to be energized with a selected time delay after operation of said switch, said contactor being connected to accelerate said motor, the combination of:

a resistance-capacitance integrating circuit; said switch being connected to apply power to said integrating circuit upon operation of said switch;

a unijunction transistor connected to said integrating circuit to be rendered conductive when the output voltage from said integrating circuit reaches a predetermined level;

a controlled rectifier having an anode, a cathode and a control lead, the anode-cathode circuit of said controlled rectifier being connected in series with said switch and said operating coil and across a power supply;

and a differentiating circuit connecting said unijunction transistor to said control lead of said controlled rectifier, whereby conduction of said transistor applies a pulse to said control lead to render said controlled rectifier conductive.

2. A system according to claim 1 having a capacitor connected in parallel with said operating coil.

3. Timing apparatus, comprising, in combination:

a control switch;

a controlled device having an operating coil;

and delay means for energizing said operating coil a predetermined amount of time after operation of said control switch, said delay means comprising a series resistance-shunt capacitance potential-integrating circuit operative to receive an applied potential and to provide an output potential across said capacitance, means for applying a potential to said integrating circuit; a unijunction transistor connected to said output potential across said capacitance and biased to be rendered conductive when said output potential reaches a predetermined level; a controlled rectifier having an anode, a cathode and a control lead, said anode-cathode circuit of said controlled rectifier being connected in series with said control switch and said operating coil across a power supply; and a series capacitor differentiating circuit connected to said unijunction transistor and operative upon conduction of said transistor to apply a pulse to said control lead of said controlled rectifier to render said controlled rectifier conductive.

4. A series motor acceleration control system, comprising, in combination:

a manual control mechanically connected to successively close a plurality of switches as said control is displaced in increasing amounts from a reference position;

a plurality of motor-accelerating contactors each having an operating coil and a pair of contacts;

a plurality of controlled rectifiers each having an anode, a cathode and a control lead, the anode-cathode circuit of each of said controlled rectifiers being connected in series with a respective one of said switches and a respective one of said operating coils;

a plurality of resistance-capacitance integrating circuits each operative to receive a respective applied potential and to provide a respective output potential;

a plurality of switching devices, each of said switching devices being connected to receive the output potential from a respective one of said integrating circuits and biased to conduct when said output potential reaches a predetermined respective potential level;

a plurality of circuit means each connected to a respective one of said switching devices and operative to provide a pulse upon conduction of its associated switching device, the pulses from each of said circuit means being connected to the control lead of a respective one of said controlled rectifiers;

and further circuit means for applying said respective applied potentials to said integrating circuits.

5. Apparatus according to claim 4 in which said further circuits means comprises means responsive to operation of a first of said switches for applying said applied potential to a first of said integrating circuits, and means responsive to conduction of various of said controlled rectifiers for applying said applied potential to respective others of said integrating circuits.

6. Apparatus according to claim 4 having a condition-responsive switch also connected in series with the anode-cathode circuit of one of said controlled rectifiers.

7. In a motor control system having a motor, a manual control adapted to operate a switch as said control is displaced a predetermined amount from a reference position, and an electromagnet contactor having an operating coil connected to be energized with a selected time delay after operation of said switch, said contactor being connected to accelerate said motor, the combination of:

a resistance-capacitance integrating circuit; said switch being connected to apply power to said integrating circuit upon operation of said switch;

a voltage-sensitive switching device connected to said integrating circuit to be rendered conductive when the output voltage from said integrating circuit reaches a predetermined level;

a controlled rectifier having an anode, a cathode and a control lead, the anode-cathode circuit of said controlled rectifier being connected in series with said switch and said operating coil and across a power supply;

and a coupling circuit connecting said voltage-sensitive switching device to said control lead of said controlled rectifier, whereby conduction of said switching device applies a pulse to said control lead to render said controlled rectifier conductive and energize said electromagnet contactor.

References Cited

UNITED STATES PATENTS

| | | | |
|---|---|---|---|
| 2,452,127 | 10/1948 | James | 318—422 XR |
| 3,226,627 | 12/1965 | Fromkin | 323—22 |
| 3,230,438 | 1/1966 | Bracutt | 318—422 XR |
| 3,287,617 | 11/1966 | Robinson | 307—885 |
| 3,304,487 | 2/1967 | McCaskey | 323—22 |
| 3,341,759 | 9/1967 | Torii | 323—97 |
| 3,341,769 | 9/1967 | Grant | 323—22 |

OTHER REFERENCES

Silicon Controlled Rectifier Manual, 2nd Edition, General Electric Co., 1961, pp. 136–137 (copy in Gp. 211).

ORIS L. RADER, *Primary Examiner.*

G. SIMMONS, *Assistant Examiner.*